United States Patent
Ohkawa et al.

(10) Patent No.: US 10,680,756 B2
(45) Date of Patent: Jun. 9, 2020

(54) PACKET CLASSIFICATION APPARATUS, PACKET CLASSIFICATION METHOD AND STORAGE MEDIUM

(71) Applicant: FUJITSU LIMITED, Kawasaki-shi, Kanagawa (JP)

(72) Inventors: Naoyoshi Ohkawa, Kawasaki (JP); Yuji Nomura, Kawasaki (JP); Fumiyuki Iizuka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 49 days.

(21) Appl. No.: 16/030,322

(22) Filed: Jul. 9, 2018

(65) Prior Publication Data
US 2019/0020443 A1    Jan. 17, 2019

(30) Foreign Application Priority Data

Jul. 14, 2017    (JP) .................................. 2017-138134

(51) Int. Cl.
*H04L 1/08*    (2006.01)
*H04L 1/16*    (2006.01)
(Continued)

(52) U.S. Cl.
CPC .............. *H04L 1/08* (2013.01); *H04L 1/1642* (2013.01); *H04L 1/1887* (2013.01); *H04L 45/74* (2013.01); *H04L 69/22* (2013.01)

(58) Field of Classification Search
CPC ....... H04L 1/0067; H04L 1/08; H04L 1/1621; H04L 1/1642; H04L 1/1829; H04L 1/1858; H04L 1/1867; H04L 1/189
(Continued)

(56) References Cited

U.S. PATENT DOCUMENTS

| 2013/0229916 | A1 | 9/2013 | Isobe et al. | |
|---|---|---|---|---|
| 2015/0109942 | A1* | 4/2015 | Nguyen | .............. H04L 43/0829 |
| 2016/0352468 | A1* | 12/2016 | Jarok | ........................ H04L 1/08 |

FOREIGN PATENT DOCUMENTS

WO    2012/066824    5/2012

OTHER PUBLICATIONS

RFC 793, "Transmission Control Protocol", Information Sciences Institute University of Southern California, Sep. 1981, 160 pages. (Year: 1981).*

(Continued)

*Primary Examiner* — Shelly A Chase
(74) *Attorney, Agent, or Firm* — Fujitsu Patent Center

(57) ABSTRACT

A storage medium having a program that executes a process including acquiring a packet formed by dividing data to be transmitted to receiving apparatus by transmitting apparatus and a packet that includes an ACK number to identify an amount of the data about which reception of packets transmitted from the transmitting apparatus to the receiving apparatus by the receiving apparatus has been confirmed; when the acquired packet is a retransmission packet and a lost packet corresponding to the retransmission packet has not been acquired, classifying a position of the lost packet as any of a last packet, an intermediate packet, and a leading packet by comparing the ACK number included in the retransmission packet and the ACK number included in each of packets previous and subsequent to the lost packet; and calculating a retransmission time by a calculation method identified based on the classified position of the lost packet.

15 Claims, 15 Drawing Sheets

(51) Int. Cl.
   *H04L 12/741* (2013.01)
   *H04L 29/06* (2006.01)
   *H04L 1/18* (2006.01)

(58) Field of Classification Search
   USPC .......................................................... 714/748
   See application file for complete search history.

(56) References Cited

OTHER PUBLICATIONS

Ashwani Parashar, "Improved Transmission Control Protocol Model", ICCICCT 2014, pp. 161-164. (Year: 2014).*

* cited by examiner

PACKET CLASSIFICATION APPARATUS, PACKET CLASSIFICATION METHOD AND STORAGE MEDIUM

CROSS-REFERENCE TO RELATED APPLICATION

This application is based upon and claims the benefit of priority of the prior Japanese Patent Application No. 2017-138134, filed on Jul. 14, 2017, the entire contents of which are incorporated herein by reference.

FIELD

The embodiments discussed herein are related to a packet classification apparatus, a packet classification method and a storage medium.

BACKGROUND

There is a service in which the communication quality is measured by capturing packets between pieces of apparatus and classifying the response time on each factor basis and a bottleneck in the response time is identified. For example, monitor apparatus is set between a client terminal and a Web server and the response time from click operation of Web screen display to the Web screen display is measured. Then, the monitor apparatus identifies a bottleneck in the response time by classifying the response time into the server processing time, the client processing time, and the transfer time. The transfer time includes the time it takes to transfer data on a network and the retransmission time from the occurrence of packet loss to transmission of a retransmission packet. As a related art, International Publication Pamphlet No. WO 2012/066824 and so forth are disclosed.

If the transfer time is identified as the bottleneck, determination of whether or not the cause thereof is based on transmission of a retransmission packet is carried out. The retransmission time may be calculated based on the time when a lost packet has been captured and the time when the retransmission packet has been captured. However, regarding a packet lost before passage through the monitor apparatus, the lost packet is not captured and only the retransmission packet is captured and therefore it is difficult to calculate the retransmission time.

If a packet is lost on the transmitting side relative to the monitor apparatus, the lost packet is not captured. For this reason, it is also conceivable that the sequence number is utilized and the arrival time of the lost packet is assumed and calculated from the arrival time of packets previous and subsequent to the lost packet. However, with this method, if data such application data is divided into plural packets to be transmitted, an error in the retransmission time becomes large depending on where the lost packet is located in the data and the reliability is low. In view of the above, it is desirable that the retransmission time of the lost packet may be calculated with a small error.

SUMMARY

According to an aspect of the embodiments, a non-transitory computer-readable storage medium having stored therein a program for packet classification, the program executing a process including acquiring a packet that is formed by dividing data to be transmitted to receiving apparatus by transmitting apparatus and a packet that includes an ACK number to identify an amount of the data about which reception of packets transmitted from the transmitting apparatus to the receiving apparatus by the receiving apparatus has been confirmed; when the acquired packet is a retransmission packet and a lost packet corresponding to the retransmission packet has not been acquired, classifying a position of the lost packet as any of a last packet, an intermediate packet, and a leading packet of the data by comparing the ACK number included in the retransmission packet and the ACK number included in each of packets previous and subsequent to the lost packet as a packet that is lost; and calculating a retransmission time by a calculation method of the retransmission time identified based on the classified position of the lost packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of a packet classification program, a packet classification method, and packet classification apparatus disclosed by the present application will be described in detail below based on the drawings. The present application is not limited by these embodiments. The respective embodiments may be combined as appropriate in a range in which contradiction is not caused.

Embodiment 1

[Overall Configuration]

Figure 1:
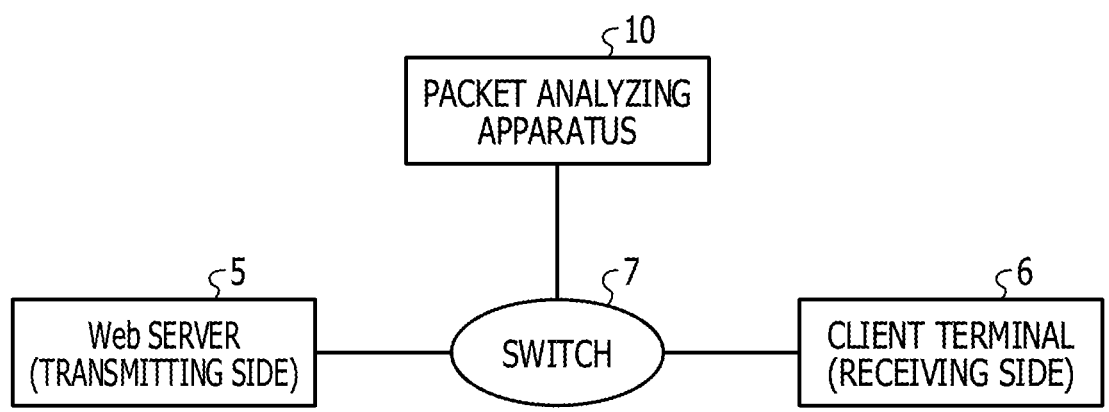
FIG. 1 is a diagram illustrating an overall configuration example of a system according to embodiment 1.

FIG. 1 is a diagram illustrating an overall configuration example of a system according to embodiment 1. As illustrated in FIG. 1, the system according to embodiment 1 is a system in which a Web server 5, a client terminal 6, a switch 7, and packet analyzing apparatus 10 are each coupled through various kinds of networks. The system according to embodiment 1 is a system that measures the communication quality between pieces of apparatus.

Here, description is made with an example in which the communication quality between the Web server 5 and the client terminal 6 is measured. However, the following description does not limit the apparatus as the target and other various kinds of apparatus such as database (DB) server and application (AP) server may be deemed as the target. Furthermore, the number of pieces of apparatus and so forth regarding each kind of apparatus are also not limited to those diagrammatically represented. Also regarding the network, various kinds of networks such as the Internet and a dedicated line may be employed irrespective of whether or not the network is a wired network or a wireless network.

The Web server 5 is one example of server apparatus that transmits data in response to a request from the client terminal 6. For example, the Web server 5 transmits data of a Web screen, image, or moving image to the client terminal 6. In the present embodiment, the Web server 5 will be described as the transmitting side in some cases.

The client terminal 6 is one example of a computer, a smartphone, or the like used by a user. The client terminal 6 transmits a request for data to the Web server 5. In the present embodiment, the client terminal 6 will be described as the receiving side in some cases.

The switch 7 is set on the communication path between the Web server 5 and the client terminal 6. The switch 7 is one example of a switching hub, a router, or the like that couples the packet analyzing apparatus 10 to this communication path.

The packet analyzing apparatus 10 is one example of computer apparatus that carries out monitoring of packets transmitted and received between the Web server 5 and the client terminal 6 through the switch 7. For example, the packet analyzing apparatus 10 measures the response time from click operation of Web screen display to the Web screen display and identifies a bottleneck in the response time.

Here, in embodiment 1, an example in which packets are transmitted between the Web server 5 and the client terminal 6 based on sliding window control of the transmission control protocol (TCP) packet is assumed as one example.

Figure 2:
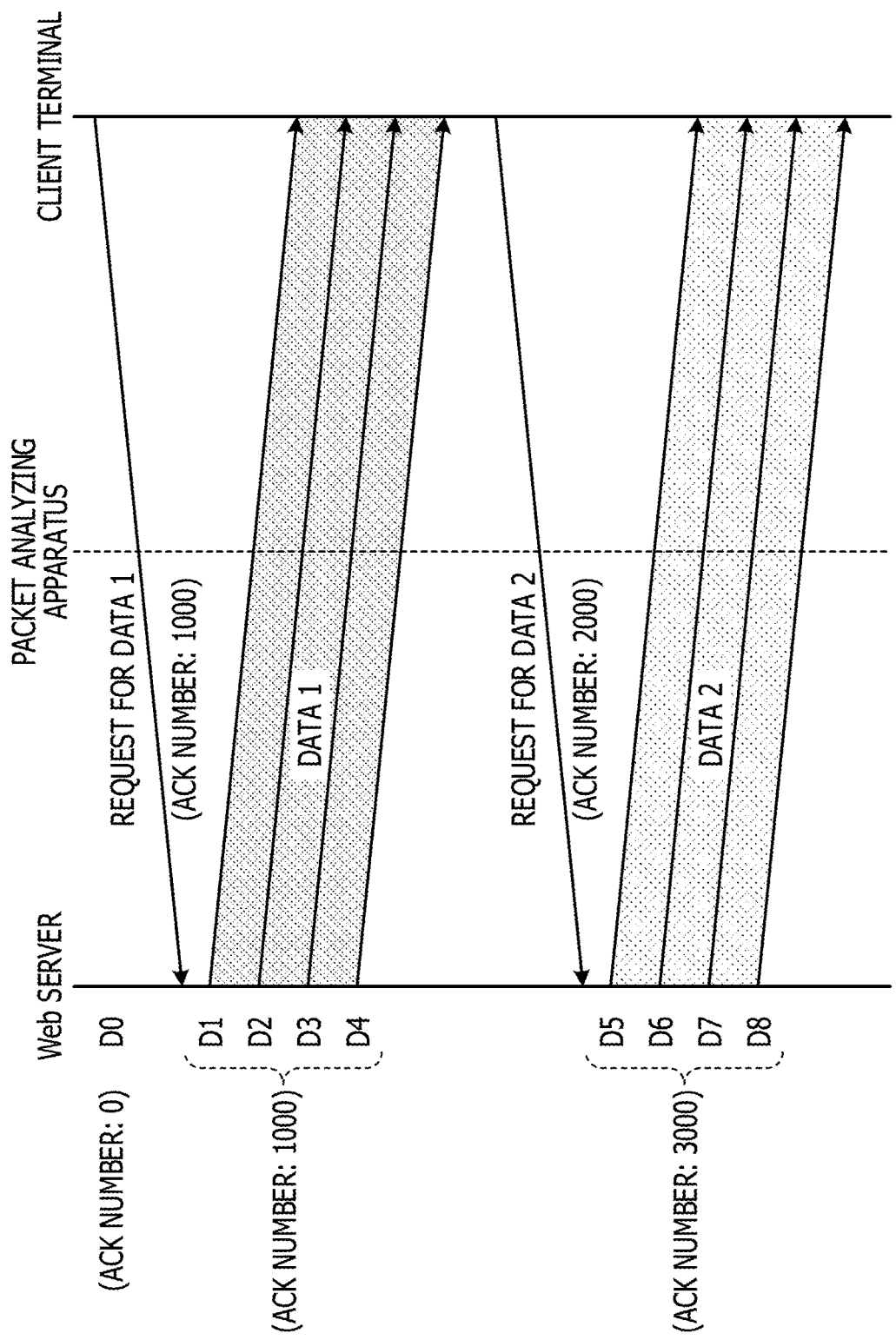
FIG. 2 is a diagram for explaining a transmission method of packets according to embodiment 1.

FIG. 2 is a diagram for explaining a transmission method of packets according to embodiment 1. In embodiment 1, the Web server 5 divides a chunk of meaningful data into a size with which transfer is possible and transmits the divided data. The Web server 5 transmits packets by the amount of data whose arrival has been newly confirmed based on an acknowledgement (ACK) from the client terminal 6. This allows the Web server 5 to transmit a large number of packets at one time consecutively by transmitting packets after receiving ACK corresponding to plural packets from the client terminal 6 compared with transmission of packets one by one to the client terminal 6.

For example, as illustrated in FIG. 2, when receiving packets up to a packet of sequential number D0 (ACK number: 0), the client terminal 6 transmits, to the Web server 5, a request for data 1 to which "ACK number: 1000" indicating that data up to 1000 bytes has been received is added. In the present embodiment, the packet of sequential number D0 will be represented as packet D0 or the like in some cases.

Then, when receiving this request, the Web server 5 divides the next data 1 of 1000 bytes confirmed based on the ACK number into plural packets and transmits the packets to the client terminal 6. For example, the Web server 5 adds ACK number "1000 (=0 bytes of ACK number+1000 of ACK number)" to each of sequential numbers D1, D2, D3, and D4 and transmits the packets.

Thereafter, when receiving packets up to the packet of sequential number D4 (ACK number: 1000), the client terminal 6 transmits, to the Web server 5, a request for data 2 to which "ACK number: 2000 (1000 of ACK number+1000 of ACK number)" indicating that data up to 2000 bytes in total has been received is added.

Then, when receiving this request, the Web server 5 divides the next data 2 of 1000 bytes confirmed based on the ACK number into plural packets and transmits the packets to the client terminal 6. For example, the Web server 5 adds ACK number "3000 (=1000 of ACK number+2000 of ACK number)" to each of sequential numbers D5, D6, D7, and D8 and transmits the packets.

In transmission and reception of packets based on such sliding window control, the packet analyzing apparatus 10 carries out monitoring of packets transmitted and received between the Web server 5 and the client terminal 6. For example, by the monitoring, the packet analyzing apparatus 10 measures the response time from click operation of Web screen display to the Web screen display. Moreover, the packet analyzing apparatus 10 identifies a bottleneck in the response time by classifying the response time into the server processing time, the client processing time, and the transfer time.

Here, if retransmission of a packet due to packet loss occurs, the packet analyzing apparatus 10 estimates the retransmission time from the occurrence of the packet loss to transmission of the retransmission packet. However, it is difficult for the packet analyzing apparatus 10 to estimate the retransmission time if the packet loss has occurred on the transmitting side relative to the packet analyzing apparatus 10.

Figure 3A:
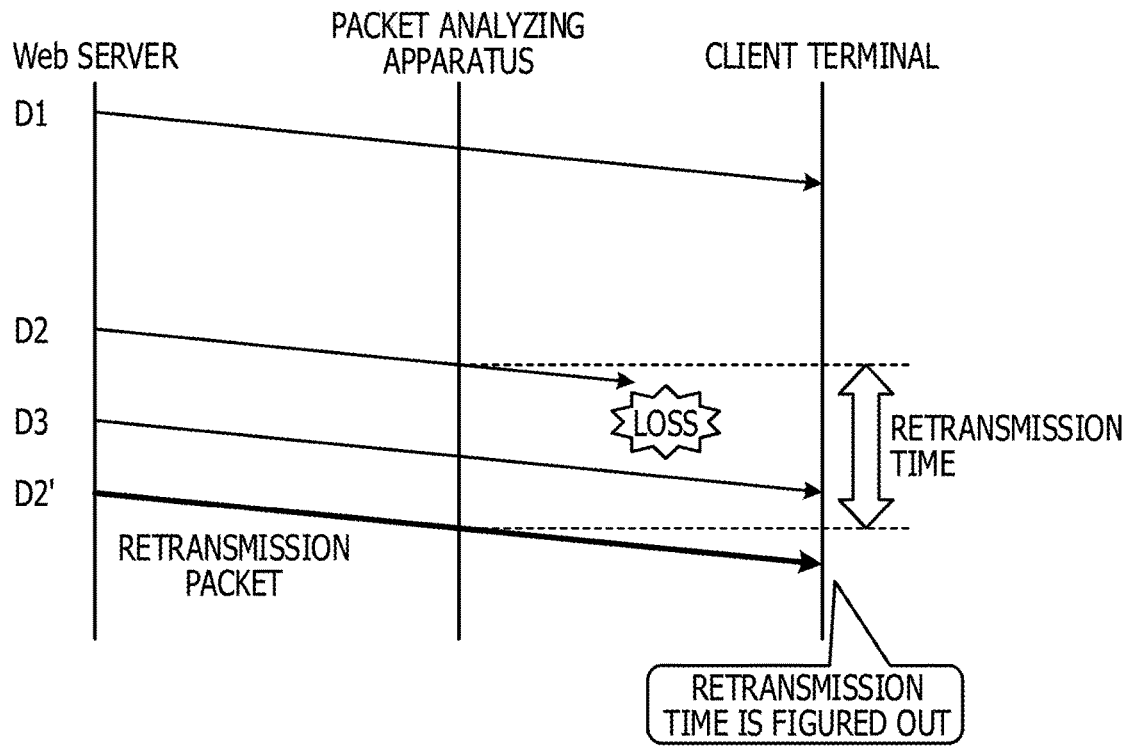
FIGS. 3A and 3B are diagrams for explaining measurement of retransmission time.
Figure 3B:
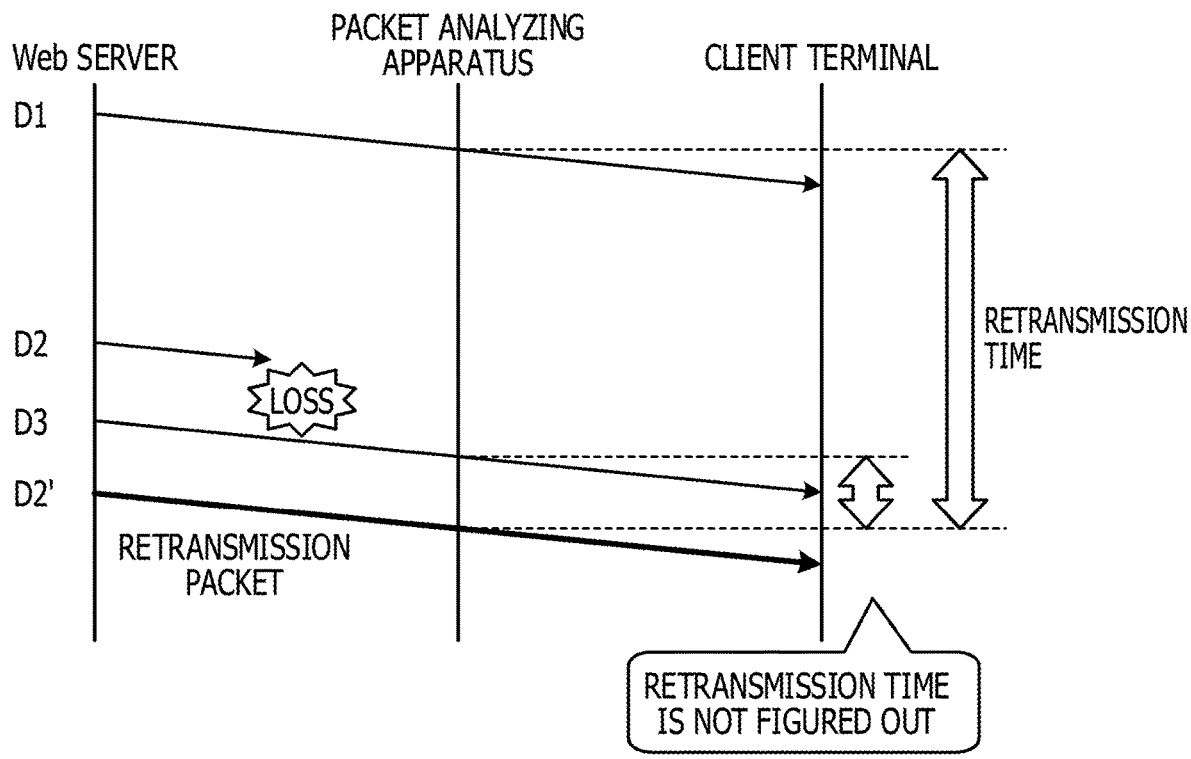

FIGS. 3A and 3B are diagrams for explaining measurement of retransmission time. FIG. 3A illustrates an example in which packet loss has occurred on the receiving side relative to the packet analyzing apparatus 10. Suppose that, as illustrated in FIG. 3A, the packet analyzing apparatus 10 has received a retransmission packet D2' of a packet D2 after receiving packet D1, packet D2, and packet D3. In this case, because having received the packet D2 once, the packet analyzing apparatus 10 may estimate the time difference between the reception time of the packet D2 and the reception time of the retransmission packet D2' as the retransmission time.

On the other hand, FIG. 3B illustrates an example in which packet loss has occurred on the transmitting side relative to the packet analyzing apparatus 10. As illustrated in FIG. 3B, the packet analyzing apparatus 10 receives the retransmission packet D2' of the packet D2 after receiving the packet D1 and the packet D3. In this case, because the packet analyzing apparatus 10 has never received the packet D2, it is difficult for the packet analyzing apparatus 10 to identify the reception time of the original packet D2 and estimate the retransmission time. For example, in some cases, the packet analyzing apparatus 10 erroneously recognizes the time difference between the reception time of the packet D1 and the reception time of the retransmission packet D2' or the time difference between the reception time of the packet D3 and the reception time of the retransmission packet D2' as the retransmission time.

Therefore, the packet analyzing apparatus 10 according to embodiment 1 acquires divided data obtained by dividing data transmitted to the client terminal 6 by the Web server 5 and a packet including the ACK number to identify the amount of data about which reception of packets transmitted from the Web server 5 to the client terminal 6 by the client terminal 6 has been confirmed. Then, if the acquired packet is a retransmission packet and the lost packet corresponding to the retransmission packet has not been acquired, the packet analyzing apparatus 10 compares the ACK number included in the retransmission packet and the ACK number included in each of packets previous and subsequent to the lost packet, which is a packet that is lost. Subsequently, the packet analyzing apparatus 10 classifies the position of the lost packet as any of the last packet, the intermediate packet, and the leading packet of data. Thereafter, the packet analyzing apparatus 10 calculates the retransmission time by a calculation method of the retransmission time identified based on the classified position of the lost packet. In this manner, the packet analyzing apparatus 10 may accurately calculate the retransmission time of the packet. The retransmission time will be described as the retransmission delay time in some cases because being the time taken from packet loss to the arrival of the retransmission packet.

[Functional Configuration]

Figure 4:
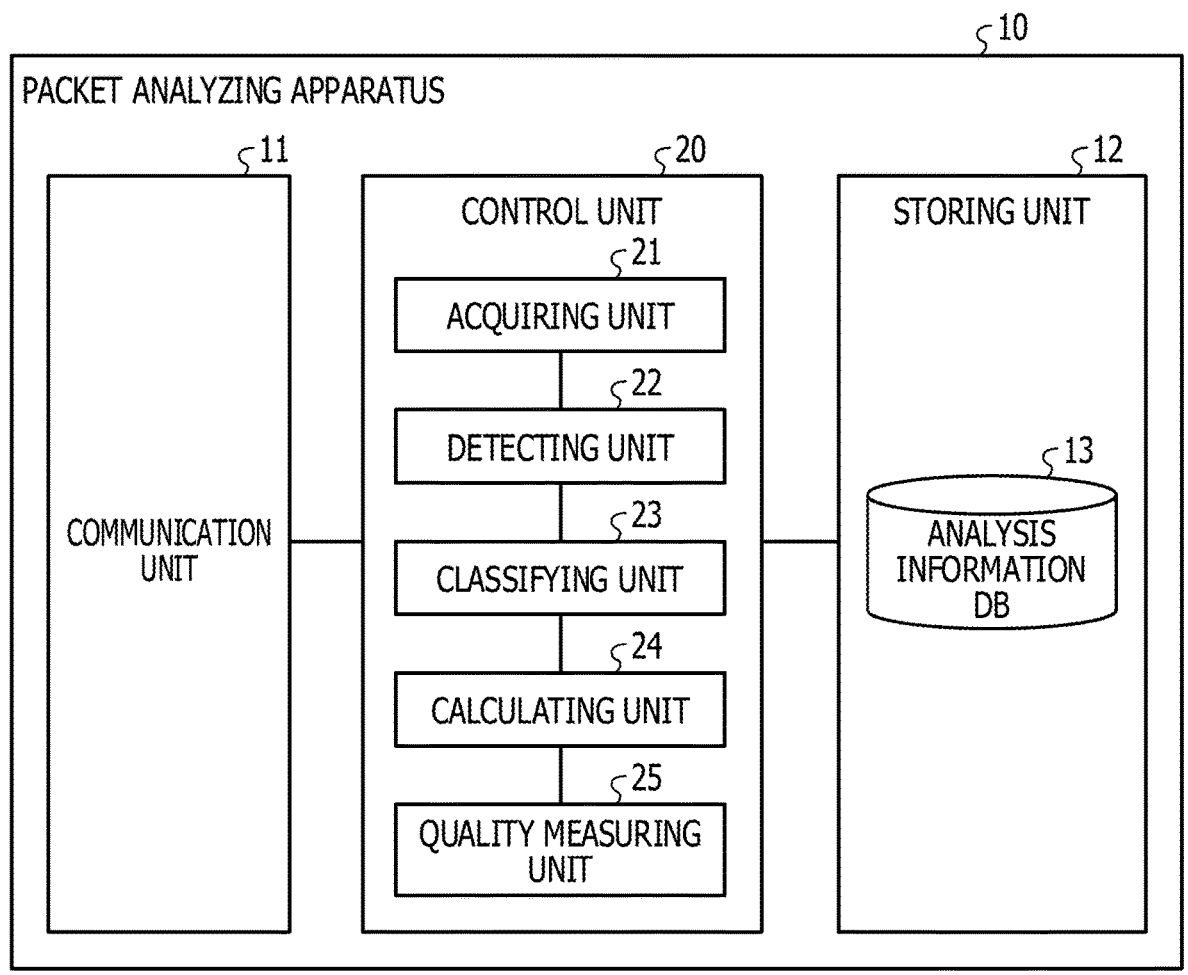
FIG. 4 is a functional block diagram illustrating a functional configuration of packet analyzing apparatus according to embodiment 1.

FIG. 4 is a functional block diagram illustrating a functional configuration of a packet analyzing apparatus according to embodiment 1. The packet analyzing apparatus illustrated in FIG. 4 may be the packet analyzing apparatus 10 illustrated in FIG. 1. As illustrated in FIG. 4, the packet analyzing apparatus 10 includes a communication unit 11, a storing unit 12, and a control unit 20.

The communication unit 11 is a processing unit that receives packets. For example, the communication unit 11 is coupled to the switch 7 and receives packets transmitted and received between the Web server 5 and the client terminal 6. The storing unit 12 is one example of storing apparatus that stores an analysis information DB 13 and is a memory, hard disk, or the like.

The analysis information DB 13 is a database that stores information relating to the packets that have passed through the packet analyzing apparatus 10 and various kinds of information used for analysis of the communication quality. For example, the analysis information DB 13 stores the sequential number (seq), the ACK number (pre_ack), the reception time (pre_time), the packet length (len), and information indicating whether or not a push flag (PSH flag) of the TCP exists regarding the packets that have arrived.

The analysis information DB 13 stores the sequential number of the target to arrive next (next_seq), the arrival time of the packet immediately previous to the lost packet (time_before_loss), information indicating whether or not the PSH flag of the packet immediately previous to the lost packet exists (psh_before_loss), the ACK number of the packet immediately subsequent to the lost packet (ack_after_loss), the arrival time of the packet immediately subsequent to the lost packet (time_after_loss), the network bandwidth set or measured in advance (BW), the retransmission time of the lost packet (rtrns_time), the maximum length of the packet (max_len), and the estimated transmission clock time of the lost packet (time_loss).

The control unit 20 is a processing unit responsible for the whole of the packet analyzing apparatus 10 and is a processor, for example. The control unit 20 includes an acquiring unit 21, a detecting unit 22, a classifying unit 23, a calculating unit 24, and a quality measuring unit 25. The acquiring unit 21, the detecting unit 22, the classifying unit 23, the calculating unit 24, and the quality measuring unit 25 are one example of an electronic circuit possessed by a processor, one example of a process executed by a processor, or the like.

The acquiring unit 21 is a processing unit that acquires information relating to the packets that have arrived at the packet analyzing apparatus 10. For example, the acquiring unit 21 acquires the arrival time, the sequential number, the packet length, the ACK number, and information indicating whether or not the PSH flag exists from the header or the like of the packet that has arrived, and stores the acquired information in the analysis information DB 13.

The detecting unit 22 is a processing unit that carries out detection of loss of a packet and the retransmission packet. For example, the detecting unit 22 detects packet loss by managing the sequential number of the packets that have arrived. To cite one example, if the packet D1, the packet D2, and the packet D4 have arrived, the detecting unit 22 detects loss of the packet D3 because the packet D3 has not arrived.

The detecting unit 22 executes detection of the retransmission packet of a lost packet. To cite one example, if the sequential number of the packet that has arrived is smaller than the sequential number of the packet to arrive next (next_seq) set at the present timing, the detecting unit 22 determines that the packet that has arrived is a retransmission packet. Similarly, if the sequential number of the packet that has arrived is the same as the sequential number (next_seq), the detecting unit 22 determines that the packet that has arrived is a normal packet. If the sequential number of the packet that has arrived is larger than the sequential number (next_seq), the detecting unit 22 determines that loss of the same number of packets as the difference between these sequential numbers has occurred.

For update of the sequential number (next_seq), a typical method may be employed. To cite one example, if the packet that has arrived is a normal packet, the detecting unit 22 sets the value obtained by incrementing the sequential number of the packet that has arrived by one as "next_seq." If the packet that has arrived is a retransmission packet or packet loss is detected, the detecting unit 22 suppresses change until the packet corresponding with "next_seq" arrives.

The classifying unit 23 is a processing unit that classifies the position of the lost packet corresponding to the retransmission packet as any of the last packet, the intermediate packet, and the leading packet of data. For example, the classifying unit 23 classifies the position of the lost packet based on the PSH flag of the retransmission packet that has arrived and whether or not an increase exists in the ACK number of the lost packet corresponding to the retransmission packet that has arrived.

For example, the classifying unit 23 identifies the ACK number of the retransmission packet and the sequential number of the retransmission packet. Subsequently, the classifying unit 23 identifies the packets previous and subsequent to the lost packet from the sequential number of the retransmission packet and identifies also the ACK number of the packets previous and subsequent to the lost packet.

Here, description will be made by taking an example of a communication format in which the PSH flag is used. If the PSH flag is added to the packet that has arrived and is immediately previous to the lost packet corresponding to the retransmission packet, the classifying unit 23 classifies the lost packet as the leading packet of data. If the PSH flag is added to the retransmission packet, the classifying unit 23 classifies the lost packet as the last packet of data. The classifying unit 23 identifies the data to which the lost packet belongs from the ACK number of the packets previous and subsequent to the lost packet. In the case in which the PSH flag is added to neither the packet immediately previous to the lost packet nor the retransmission packet, if the ACK number of the packet immediately subsequent to the lost packet increases from the ACK number of the packet immediately previous to the lost packet, the classifying unit 23 classifies the lost packet as the leading packet. On the other hand, if the ACK number of the packet immediately subsequent to the lost packet does not increase from the ACK number of the packet immediately previous to the lost packet and is the same, the classifying unit 23 classifies the lost packet as the intermediate packet.

In the case of a communication format in which the PSH flag is not used or if the PSH flag is not added to the retransmission packet even in a communication format in which the PSH flag is used, the classifying unit 23 may classify the position of the lost packet according to comparison of the ACK number and the increase status of the ACK number. For example, the classifying unit 23 classifies the lost packet as the last packet if the ACK number of the lost packet (ACK number of the retransmission packet) corresponds with the ACK number of the packet immediately previous to the lost packet and the ACK number of the packet immediately subsequent to the lost packet increases from the ACK number of the lost packet.

The classifying unit 23 classifies the lost packet as the leading packet if the ACK number of the lost packet (ACK number of the retransmission packet) increases from the ACK number of the packet immediately previous to the lost packet and the ACK number of the packet immediately subsequent to the lost packet corresponds with the ACK number of the lost packet. The classifying unit 23 classifies the lost packet as the intermediate packet if the ACK number of the lost packet (ACK number of the retransmission packet), the ACK number of the packet immediately previous to the lost packet, and the ACK number of the packet immediately subsequent to the lost packet correspond with each other.

A concrete example will be described by using the example of FIG. 2. Here, description will be made with an example in which the packet D5 is lost and a retransmission packet D5' of the packet D5 that does not include the PSH flag is received subsequently to the packet D8. For example, the classifying unit 23 classifies the position of the lost packet as the last packet if the ACK number of the retransmission packet D5' is 1000 and corresponds with the ACK number (1000) of the packet D4 immediately previous to the lost packet and is smaller than the ACK number (3000) of the packet D6 immediately subsequent to the lost packet. At this time, because the packet D4 including the ACK number corresponding with the ACK number of the retransmission packet D5' belongs to data 1, the classifying unit 23 classifies the position of the lost packet as the last packet of data 1.

The classifying unit 23 classifies the position of the lost packet as the leading packet if the ACK number of the retransmission packet D5' is 3000 and is larger than the ACK number (1000) of the packet D4 immediately previous to the lost packet and corresponds with the ACK number (3000) of the packet D6 immediately subsequent to the lost packet. At this time, because the packet D6 including the ACK number corresponding with the ACK number of the retransmission packet D5' belongs to data 2, the classifying unit 23 classifies the position of the lost packet as the leading packet of data 2.

The classifying unit 23 classifies the position of the lost packet as the intermediate packet if the ACK number of the retransmission packet D5' is 3000 and both the ACK number of the packet D4 immediately previous to the lost packet and the ACK number of the packet D6 immediately subsequent to the lost packet are also 3000. At this time, the classifying unit 23 classifies the position of the lost packet as the intermediate packet of the data to which the packets previous and subsequent to the retransmission packet D5' belong.

The calculating unit 24 is a processing unit that calculates the retransmission time by using a calculation method according to the position of the lost packet. For example, if the lost packet is the leading packet, the calculating unit 24 calculates the expected time of arrival when the lost packet is normally received based on calculation expression (expression 1-1) using the network bandwidth and calculates the expected time of arrival based on calculation expression (expression 1-2) using the number of consecutive lost packets. Then, the calculating unit 24 selects the expected time of arrival ($T_i$) of the larger value (later time). Then, the calculating unit 24 calculates the estimated value of the retransmission time, for example, the estimated value of the retransmission delay time ($\Delta T_i$) of delay until retransmission, based on "arrival time of retransmission packet ($T_i'$)–expected time of arrival ($T_i$)."

$$T_i = \begin{cases} t_{i+1} - \dfrac{S_i}{BW} & \text{if } t_{i+1} - \dfrac{S_i}{BW} > t_{i-1} + \dfrac{t_{i+1} - t_{i-1}}{N_{loss} + 1}, \\ t_{i-1} + \dfrac{t_{i+1} - t_{i-1}}{N_{loss} + 1} & \text{otherwise.} \end{cases}$$

expression (1-1)

expression (1-2)

If the lost packet is the intermediate packet, the calculating unit 24 calculates the expected time of arrival based on calculation expression (expression 2) using the number of consecutive lost packets. Then, the calculating unit 24 calculates the estimated value of the retransmission delay time ($\Delta T_i$) based on "arrival time of retransmission packet ($T_i'$)–expected time of arrival ($T_i$)."

$$T_i = t_{i-1} + \dfrac{t_{i+1} - t_{i-1}}{N_{loss} + 1} \qquad \text{expression (2)}$$

If the lost packet is the last packet, the calculating unit 24 calculates the expected time of arrival based on calculation expression (expression 3-1) using the network bandwidth and calculates the expected time of arrival based on calculation expression (expression 3-2) using the number of consecutive lost packets. Then, the calculating unit 24 selects the expected time of arrival ($T_i$) of the smaller value (earlier time) and calculates the estimated value of the retransmission delay time ($\Delta T_i$) based on "arrival time of retransmission packet ($T_i'$)–expected time of arrival ($T_i$)."

$$T_i = \begin{cases} t_{i+1} - \dfrac{S_i}{BW} & \text{if } t_{i+1} - \dfrac{S_i}{BW} < t_{i-1} + \dfrac{t_{i+1} - t_{i-1}}{N_{loss} + 1}, \\ t_{i-1} + \dfrac{t_{i+1} - t_{i-1}}{N_{loss} + 1} & \text{otherwise.} \end{cases}$$

expression (3-1)

expression (3-2)

$t_i$ in expression 1 to expression 3 is the arrival time of the i-th packet and the time when the packet has arrived actually (actual measurement value). $T_i$ is the expected time of arrival of the i-th packet (lost packet) and is calculated based on the respective expressions. $S_i$ is the size of the i-th packet and the packet length of the packet that has arrived actually. BW is the network bandwidth. It is also possible to set BW in advance by an administrator or the like and it is also possible to measure BW by using a public-known technique. $N_{loss}$ is the number of packets consecutively lost and may be counted by the detecting unit 22. $T_i'$ is the actual measurement value of the arrival time of the i-th packet (retransmission packet). $\Delta T_i$ is the estimated value of the retransmission delay time.

The quality measuring unit 25 is a processing unit that measures the communication quality between the Web server 5 and the client terminal 6. For example, the quality measuring unit 25 measures the response time from click operation of Web screen display to the Web screen display. Then, the quality measuring unit 25 identifies a bottleneck in the response time by classifying the response time into the server processing time, the client processing time, and the transfer time.

The server processing time is the time taken at the time of establishment or disconnection of a session between the client terminal 6 and the Web server 5 and may be measured by a publicly-known method. The client processing time is the processing time of the Web server 5 and the time of waiting for operation by the client and may be measured by a publicly-known method. The transfer time is the total of the round trip time between end and end that may be measured by a publicly-known method, the time it takes to transfer data on the network, and the time from the occurrence of packet loss to transmission of the retransmission packet (estimated value of the retransmission delay time), calculated by the calculating unit 24.

[Flow of Processing]

Next, the respective kinds of processing executed by the packet analyzing apparatus 10 will be described. Here, the respective kinds of processing will be described after the overall flow relating to estimation of the retransmission delay time is described. Other measurement items relating to measurement of the response time may be measured by a typical method and thus detailed description is omitted. Here, description will be made by taking communication in which the PSH flag is used as one example.

(Overall Flow)

Figure 5:
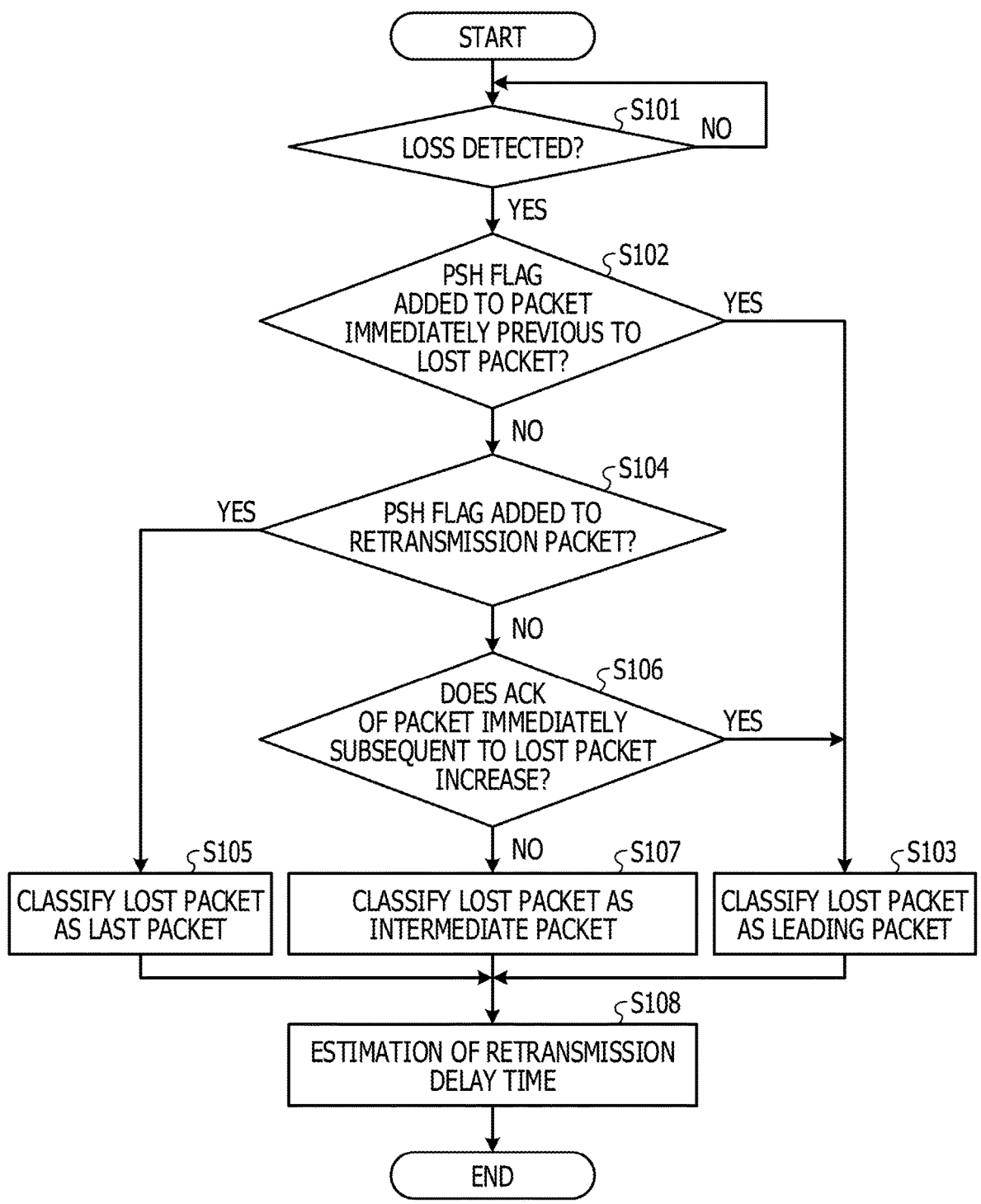
FIG. 5 is a flowchart illustrating an overall flow of processing.

FIG. 5 is a flowchart illustrating an overall flow of processing. As illustrated in FIG. 5, when the packet analyzing apparatus 10 carries out detection of packet loss and detection of a retransmission packet (S101: Yes), the packet analyzing apparatus 10 checks the PSH flag of the packet that is immediately previous to the lost packet and has arrived (S102).

Subsequently, if the PSH flag is added to the packet that is immediately previous to the lost packet and has arrived (S102: Yes), the packet analyzing apparatus 10 classifies the lost packet as the leading packet (S103).

On the other hand, if the PSH flag is not added to the packet that is immediately previous to the lost packet and has arrived (S102: No), the packet analyzing apparatus 10 determines whether or not the PSH flag is added to the retransmission packet (S104).

Then, if the PSH flag is added to the retransmission packet (S104: Yes), the packet analyzing apparatus 10 classifies the lost packet as the last packet (S105).

On the other hand, if the PSH flag is not added to the retransmission packet (S104: No), the packet analyzing apparatus 10 determines whether or not the ACK number of the packet that is immediately subsequent to the lost packet and has arrived increases (S106).

Then, if the ACK number of the packet that is immediately subsequent to the lost packet and has arrived increases (S106: Yes), the packet analyzing apparatus 10 classifies the lost packet as the leading packet (S103). On the other hand, if the ACK number of the packet that is immediately subsequent to the lost packet and has arrived does not increase (S106: No), the packet analyzing apparatus 10 classifies the lost packet as the intermediate packet (S107).

Thereafter, the packet analyzing apparatus 10 carries out estimation of the retransmission delay time by using the calculation expression according to the classification result (S108).

(Processing at the Time of Packet Reception)

Figure 6:
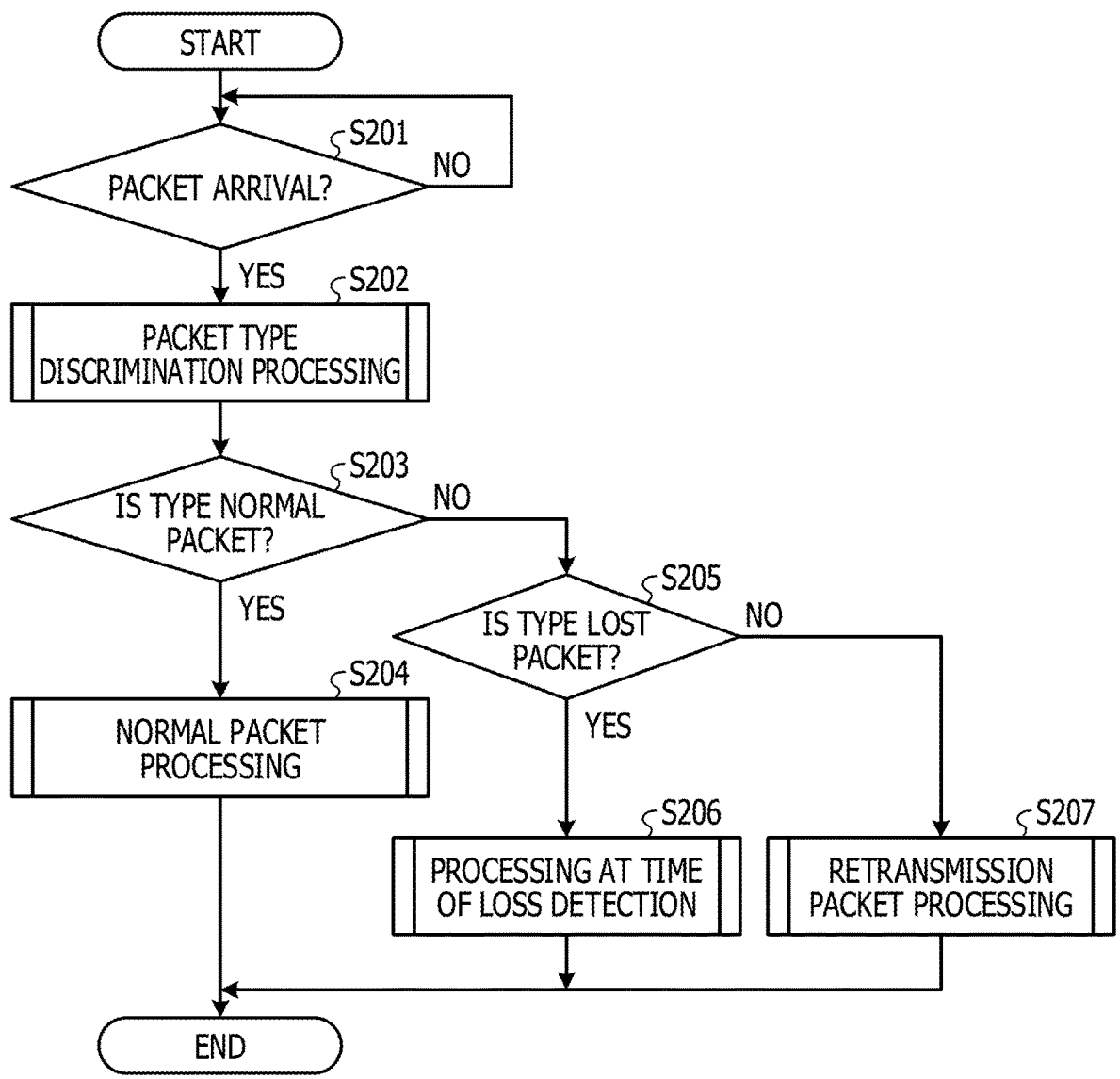
FIG. 6 is a flowchart illustrating a flow of processing at the time of packet reception.

FIG. 6 is a flowchart illustrating a flow of processing at the time of packet reception. As illustrated in FIG. 6, when the arrival of a packet is detected by the acquiring unit 21 (S201: Yes), the detecting unit 22 executes packet type discrimination processing to identify the type of the packet that has arrived (S202).

Then, when identifying the type as a normal packet (S203: Yes), the detecting unit 22 executes normal packet processing (S204). Furthermore, if the detecting unit 22 identifies the type as a lost packet (S205: Yes) rather than a normal packet (S203: No), the detecting unit 22 executes processing at the time of loss detection (S206). On the other hand, if the detecting unit 22 identifies the type as not a lost packet (S205: No), the detecting unit 22 executes retransmission packet processing (S207).

(Packet Type Discrimination Processing)

Figure 7:
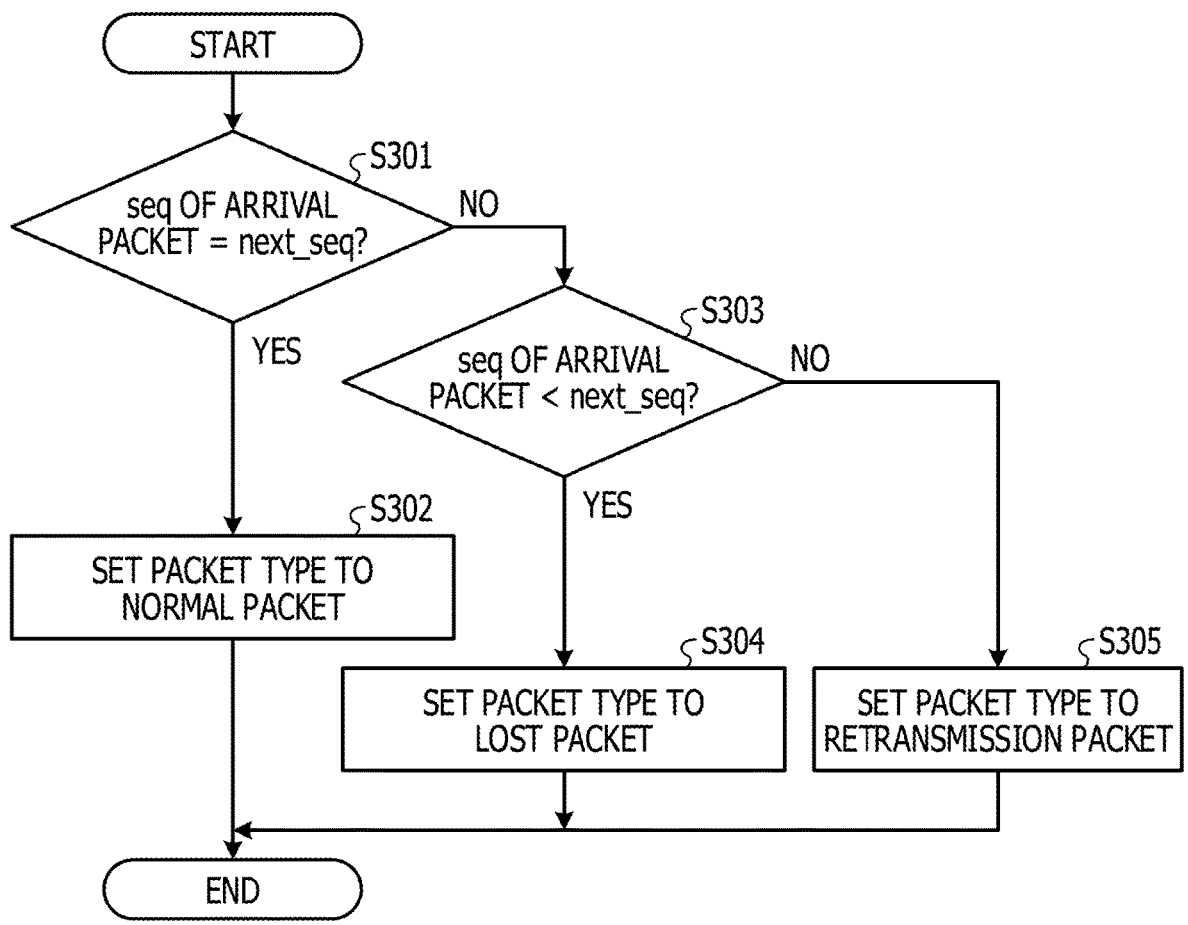
FIG. 7 is a flowchart illustrating a flow of packet type discrimination processing.

FIG. 7 is a flowchart illustrating a flow of packet type discrimination processing. This processing corresponds to S202 in FIG. 6. As illustrated in FIG. 7, if the sequential number (seq) of the arrival packet corresponds with the sequential number (next_seq) of the packet to arrive next set at the present timing (S301: Yes), the detecting unit 22 sets the type of the packet to the normal packet (S302).

On the other hand, if the sequential number (seq) of the arrival packet does not correspond with the sequential number (next_seq) of the packet to arrive next set at the present timing (S301: No) and the sequential number (seq) of the arrival packet is smaller than the sequential number (next_seq) of the packet to arrive next (S303: Yes), the detecting unit 22 sets the type of the packet to the lost packet (S304).

If the sequential number (seq) of the arrival packet is larger than the sequential number (next_seq) of the packet to arrive next (S303: No), the detecting unit 22 sets the type of the packet to the retransmission packet (S305).

(Normal Packet Processing)

Figure 8:
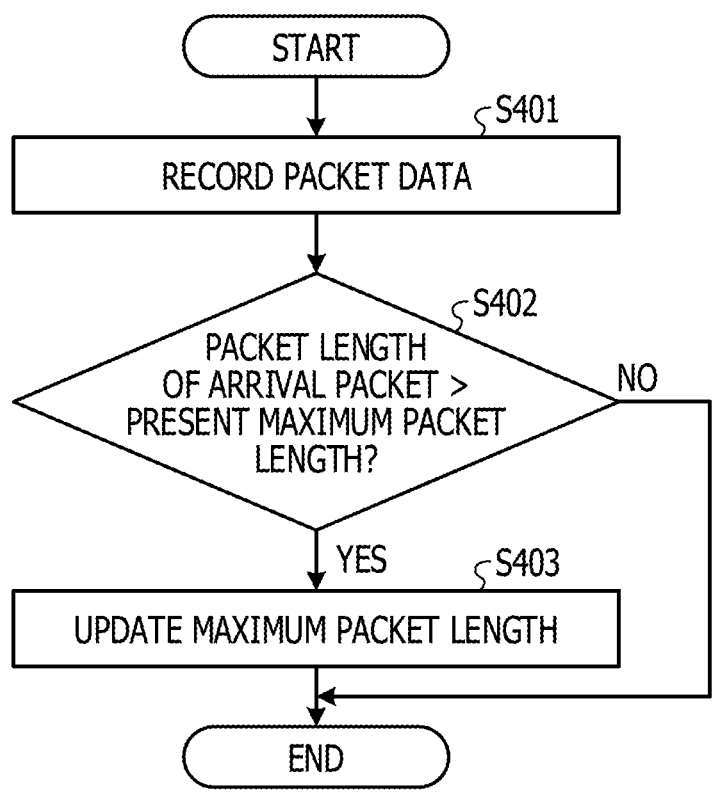
FIG. 8 is a flowchart illustrating a flow of normal packet processing.

FIG. 8 is a flowchart illustrating a flow of normal packet processing. This processing corresponds to S204 in FIG. 6. As illustrated in FIG. 8, the acquiring unit 21 records packet data relating to the packet that has arrived in the analysis information DB 13 (S401). For example, the acquiring unit 21 registers the packet length of the packet that has arrived, the ACK number, the sequential number, and information indicating whether or not the PSH flag exists. The detecting unit 22 carries out update of the sequential number of the packet to arrive next, and so forth.

Then, if the packet length (len) of the arrival packet is longer than the maximum packet length (Max_len) among the packets that have arrived (S402: Yes), the acquiring unit 21 updates the maximum packet length (Max_len) by the packet length (len) of the packet that has arrived (S403). On the other hand, if the packet length (len) of the arrival packet is shorter than the maximum packet length (Max_len) among the packets that have arrived (S402: No), the acquiring unit 21 keeps the maximum packet length (Max_len) as it is.

For example, the acquiring unit 21 manages the maximum packet length among the respective packets with which data is transmitted in a divided manner. The acquiring unit 21 may manage also the maximum packet length among the respective packets transmitted and received in a session between the Web server 5 and the client terminal 6 while the session is connected as well as the maximum packet length among packets of data.

(Processing at the Time of Loss Detection)

Figure 9:
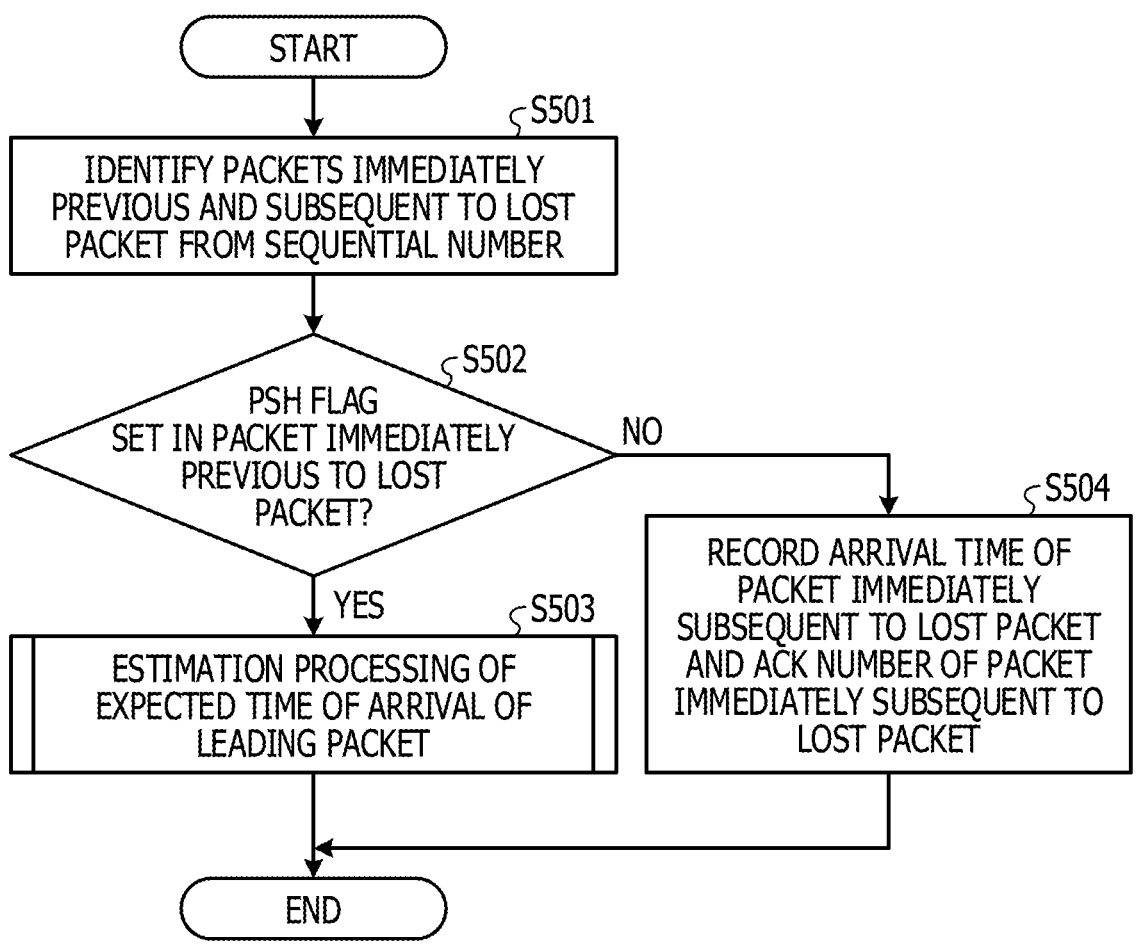
FIG. 9 is a flowchart illustrating a flow of processing at the time of loss detection.

FIG. 9 is a flowchart illustrating a flow of processing at the time of loss detection. This processing corresponds to S206 in FIG. 6. As illustrated in FIG. 9, the classifying unit 23 identifies the packet immediately previous to the lost packet and the packet immediately subsequent to the lost packet among the packets that have arrived from the sequential number of the packet that has arrived (S501).

Then, the classifying unit 23 determines whether or not the PSH flag is set in the packet immediately previous to the lost packet (S502). Here, if the PSH flag is set in the packet immediately previous to the lost packet (S502: Yes), the calculating unit 24 executes estimation processing of the expected time of arrival of the leading packet (S503). On the other hand, if the PSH flag is not set in the packet immediately previous to the lost packet (S502: No), the classifying unit 23 records the arrival time of the packet immediately subsequent to the lost packet and the ACK number of the packet immediately subsequent to the lost packet (S504).

(Estimation Processing of Expected Time of Arrival of Leading Packet)

Figure 10:
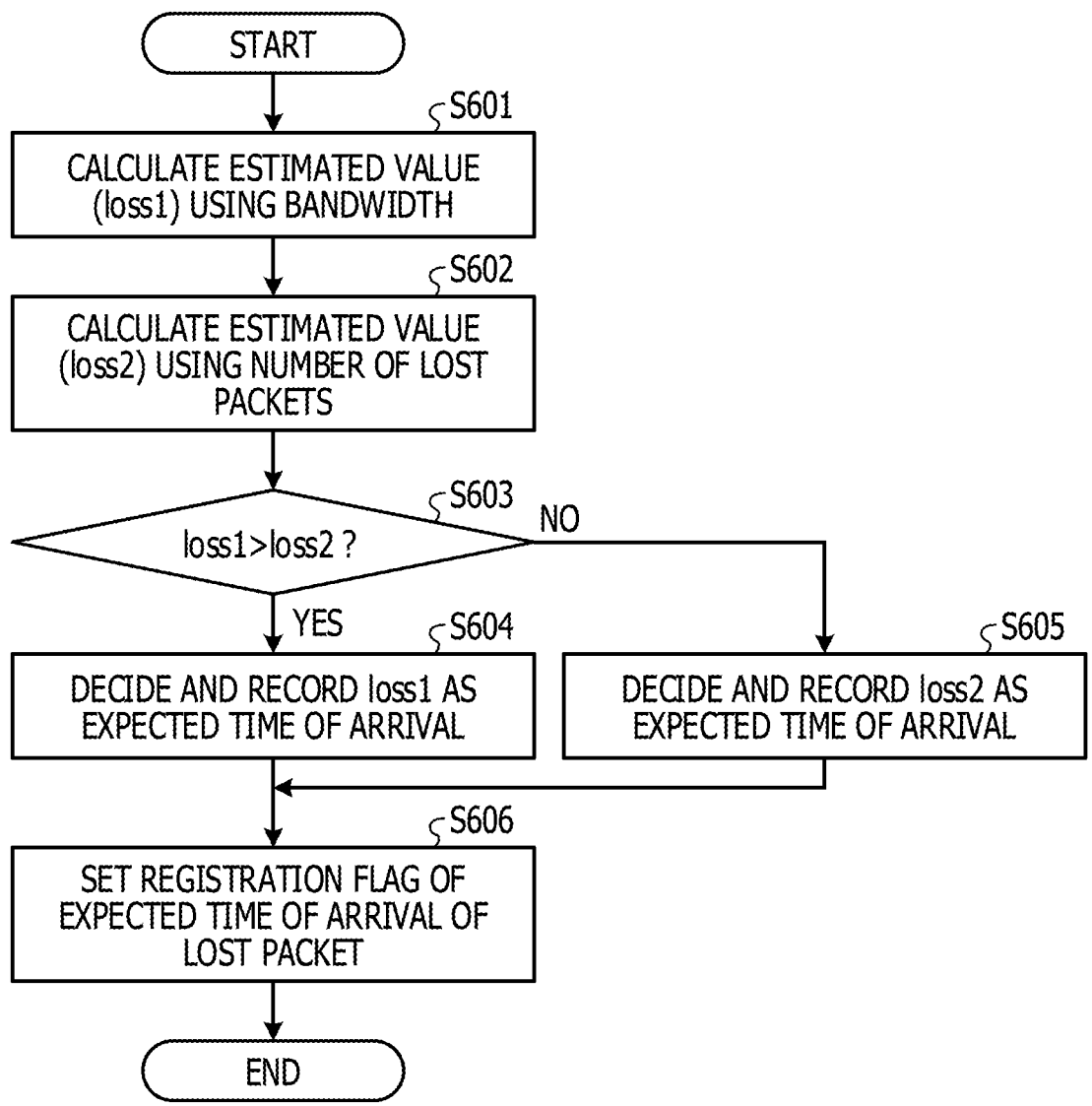
FIG. 10 is a flowchart illustrating a flow of estimation processing of expected time of arrival of a leading packet.

FIG. 10 is a flowchart illustrating a flow of estimation processing of expected time of arrival of a leading packet. As illustrated in FIG. 10, the calculating unit 24 calculates an estimated value (loss1) using the bandwidth based on the above-described expression (1-1) (S601) and calculates an estimated value (loss2) using the number of lost packets based on the above-described expression (1-2) (S602).

Then, if the estimated value (loss1) is larger than the estimated value (loss2) (S603: Yes), the calculating unit 24 decides the estimated value (loss1) as the expected time of arrival when it is assumed that the lost packet has normally arrived, and records the estimated value (loss1) in the storing unit 12 and so forth (S604).

On the other hand, if the estimated value (loss1) is equal to or smaller than the estimated value (loss2) (S603: No), the calculating unit 24 decides the estimated value (loss2) as the expected time of arrival when it is assumed that the lost packet has normally arrived, and records the estimated value (loss2) in the storing unit 12 and so forth (S605).

Thereafter, the calculating unit 24 sets a registration flag (time_loss_flag) indicating that the expected time of arrival of the lost packet has been calculated (S606). For example, the calculating unit 24 sets "time_loss_flag=true."

(Retransmission Packet Processing)

Figure 11:
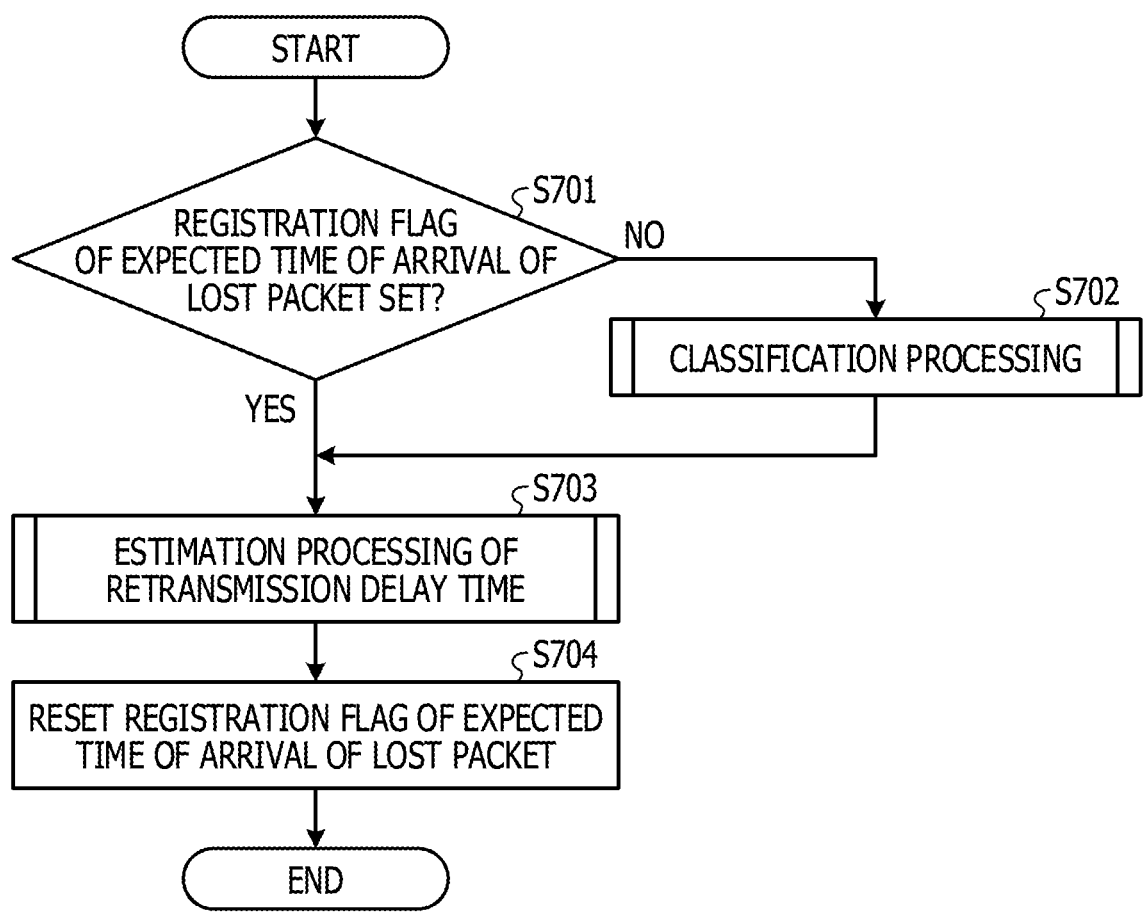
FIG. 11 is a flowchart illustrating a flow of retransmission packet processing.

FIG. 11 is a flowchart illustrating a flow of retransmission packet processing. This processing corresponds to S207 in FIG. 6. As illustrated in FIG. 11, if the registration flag (time_loss_flag) of the expected time of arrival of the lost packet is not set (S701: No), the classifying unit 23 executes classification processing to be described later (S702).

On the other hand, if the registration flag (time_loss_flag) of the expected time of arrival of the lost packet is set (S701: Yes) or the classification processing of S702 is completed, the calculating unit 24 executes estimation processing of the retransmission delay time of the lost packet (S703). For example, the calculating unit 24 calculates the above-described "estimated value of retransmission delay time $(\Delta T_i)$=arrival time of retransmission packet $(T_i')$−expected time of arrival $(T_i)$."

Thereafter, the calculating unit 24 resets the registration flag (time_loss_flag) of the expected time of arrival of the lost packet (S704). For example, the calculating unit 24 sets "time_loss_flag=false."

(Classification Processing)

Figure 12:
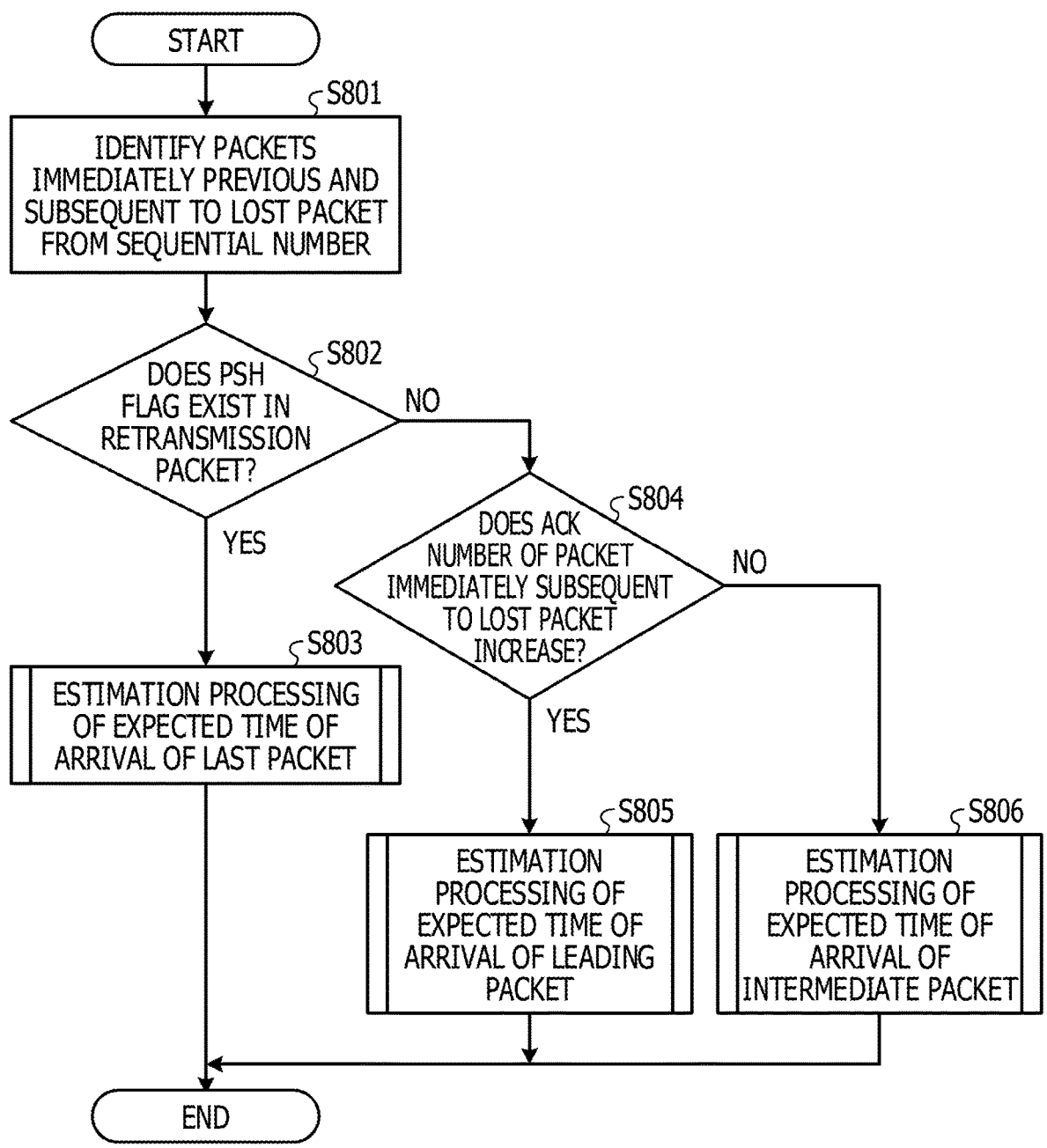
FIG. 12 is a flowchart illustrating a flow of classification processing.

FIG. 12 is a flowchart illustrating a flow of classification processing. As illustrated in FIG. 12, the classifying unit 23 identifies the packets immediately previous and subsequent to the lost packet from the sequential number of the retransmission packet (S801).

Then, if it is determined by the classifying unit 23 that the PSH flag is added to the retransmission packet (S802: Yes), the calculating unit 24 executes estimation processing of the expected time of arrival of the last packet to be described later (S803).

On the other hand, if the PSH flag is not added to the retransmission packet (S802: No), the classifying unit 23 determines whether or not the ACK number of the packet immediately subsequent to the lost packet increases from the ACK number of the packet immediately previous to the lost packet (S804).

Then, if it is determined by the classifying unit 23 that the ACK number increases (S804: Yes), the estimation processing of the expected time of arrival of the leading packet described with use of FIG. 10 is executed (S805).

On the other hand, if it is determined by the classifying unit 23 that the ACK number does not increase (S804: No), the calculating unit 24 executes estimation processing of the expected time of arrival of the intermediate packet (S806). For example, the calculating unit 24 calculates the estimated value based on the above-described expression (2).

(Estimation Processing of Expected Time of Arrival of Last Packet)

Figure 13:
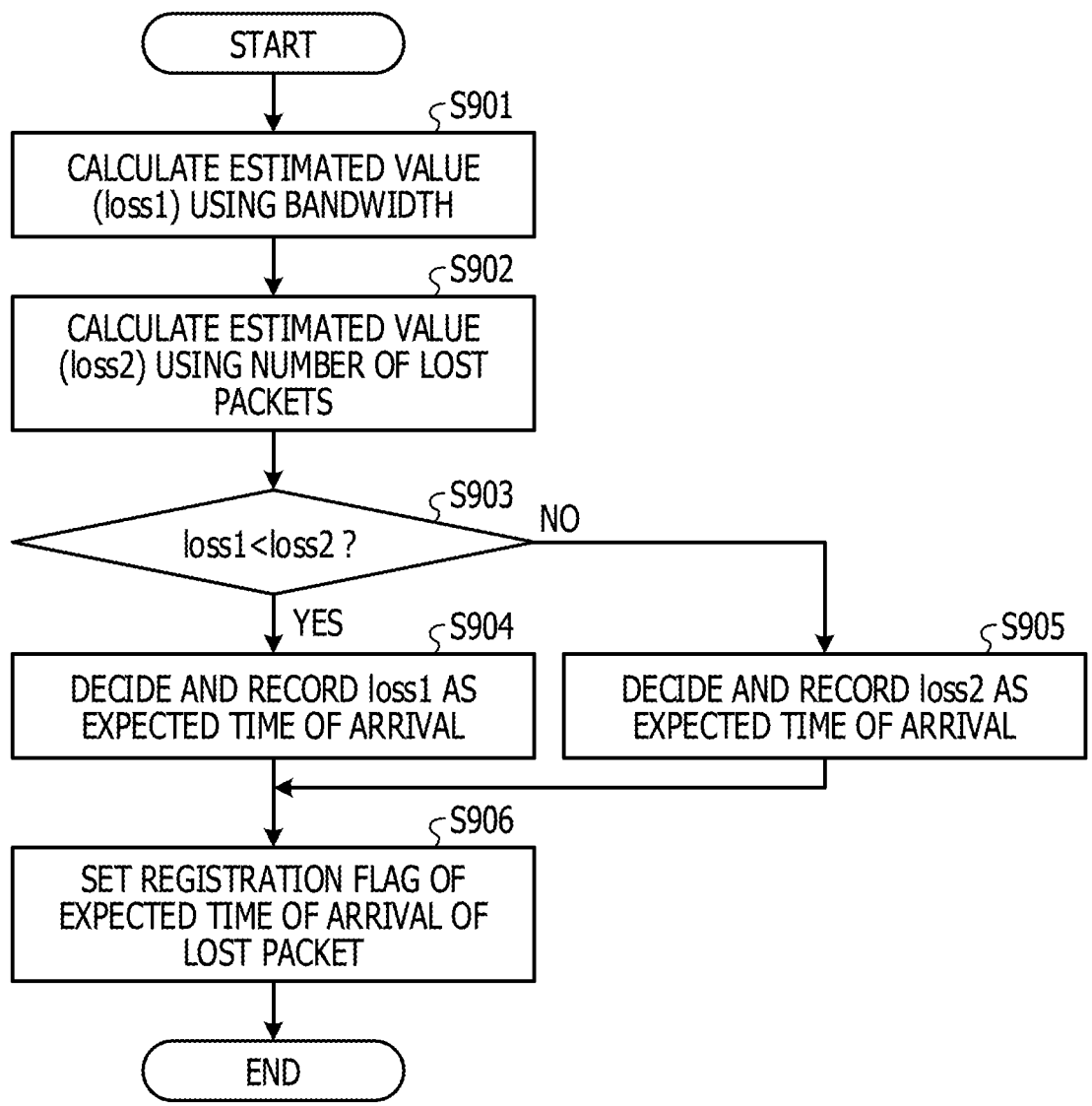
FIG. 13 is a flowchart illustrating a flow of estimation processing of expected time of arrival of a last packet.

FIG. 13 is a flowchart illustrating a flow of estimation processing of expected time of arrival of a last packet. As illustrated in FIG. 13, the calculating unit 24 calculates an estimated value (loss1) using the bandwidth based on the above-described expression (3-1) (S901) and calculates an estimated value (loss2) using the number of lost packets based on the above-described expression (3-2) (S902).

Then, if the estimated value (loss1) is smaller than the estimated value (loss2) (S903: Yes), the calculating unit 24 decides the estimated value (loss1) as the expected time of arrival when it is assumed that the lost packet has normally arrived, and records the estimated value (loss1) in the storing unit 12 and so forth (S904).

On the other hand, if the estimated value (loss1) is equal to or larger than the estimated value (loss2) (S903: No), the calculating unit 24 decides the estimated value (loss2) as the expected time of arrival when it is assumed that the lost packet has normally arrived, and records the estimated value (loss2) in the storing unit 12 and so forth (S905).

Thereafter, the calculating unit 24 sets a registration flag (time_loss_flag) indicating that the expected time of arrival of the lost packet has been calculated (S906). For example, the calculating unit 24 sets "time_loss_flag=true."

[Effects]

As described above, the packet analyzing apparatus 10 determines which position the lost packet exists at in a chunk of meaningful data (for example, application data). For example, if the lost packet is the leading packet of application data, the packet analyzing apparatus 10 determines that the possibility that the lost packet has been transmitted continuously with data immediately subsequent to the lost packet is high. Furthermore, if the lost packet is the intermediate packet of application data, the packet analyzing apparatus 10 determines that the possibility that the lost packet has been transmitted around the center of the packets immediately previous and subsequent to the lost packet is high. If the lost packet is the last packet of application data, the packet analyzing apparatus 10 determines that the possibility that the lost packet has been transmitted continuously with data immediately previous to the lost packet is high.

Then, by using the calculation expression according to the position of the lost packet, the packet analyzing apparatus 10 may calculate the transmission time of the lost packet, for example, the expected time of arrival at which the lost packet is expected to arrive at the packet analyzing apparatus 10 if this packet is not lost. As a result, the packet analyzing apparatus 10 may calculate the retransmission delay time of the lost packet.

Figure 14:
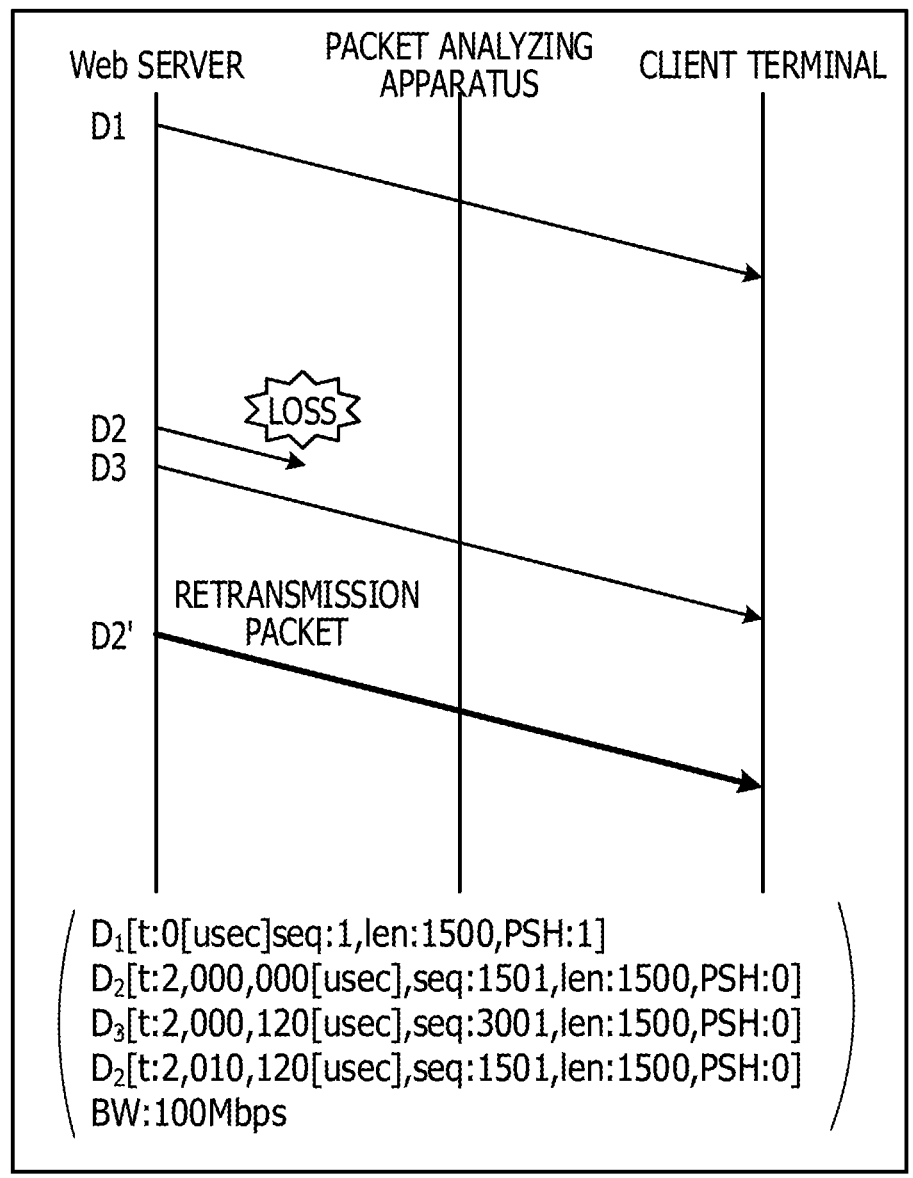
FIG. 14 is a diagram for explaining estimation of retransmission delay due to packet loss.

FIG. 14 is a diagram for explaining estimation of retransmission delay due to packet loss. As illustrated in FIG. 14, the Web server 5 transmits packets in order of the packet D1, the packet D2, and the packet D3. Suppose that each packet length is 1500 (bytes) and the network bandwidth (BW) is 100 Mbps. Here, description will be made by taking the example in which expression (1-1) is used as one example.

Here, in FIG. 14, the packet D1 with a sequential number "1" arrives at the packet analyzing apparatus 10 at a clock time t1 "0 (usec)." Thereafter, the packet D2 is lost and the packet D3 with a sequential number "3001" arrives at a clock time t3 "2,000,120 (usec)." Thereafter, a packet D2' with a sequential number "1501" as the retransmission packet of the packet D2 arrives at the packet analyzing apparatus 10 at a clock time t2' "2,010,120 (usec)."

In a typical method, the middle between the packet D1 and the packet D3 is estimated as the arrival time of the lost packet, so that the expected time of arrival of the lost packet is predicted as "1,000,000 (usec)." Thus, the estimated time of the retransmission delay is figured out as "2,010,120−1,000,000=1,010,120 (usec)."

On the other hand, the packet analyzing apparatus 10 according to embodiment 1 figures out the expected time of arrival of the lost packet as "t3−(8×(len/BW))"="2,000,120−(8×(1500/100))"="2,000,000." Then, the packet analyzing apparatus 10 figures out "retransmission delay time=t2' (2,010,120)−2,000,000=10,120."

As above, the retransmission delay time involving a large error is figured out in the typical method, whereas the packet analyzing apparatus 10 according to embodiment 1 may figure out the retransmission delay time with a smaller error.

Embodiment 2

Although the embodiment of the present application is described thus far, the present application may be carried out in various different modes besides the above-described embodiment. Therefore, a different embodiment will be described below.

[System]

Processing procedures, control procedures, concrete names, information including various kinds of data and parameters represented in the above document and the drawings may be arbitrarily changed if not otherwise specified. Furthermore, the respective kinds of processing may be arbitrarily distributed or integrated. For example, the classifying unit 23 may execute also the processing of the acquiring unit 21 and the detecting unit 22. The acquiring unit 21 is one example of an acquiring unit. The classifying unit 23 is one example of a classifying unit. The calculating unit 24 is one example of a calculating unit.

The respective constituent elements of the respective pieces of apparatus that are diagrammatically represented are functionally conceptual and do not necessarily have to be configured as diagrammatically represented physically. For example, concrete forms of distribution and integration of the respective pieces of apparatus are not limited to the diagrammatically-represented forms. For example, all or part of the respective pieces of apparatus may be configured to be distributed or integrated functionally or physically in an arbitrary unit according to various kinds of loads and the status of use. Moreover, all or an arbitrary part of the respective processing functions carried out in the respective pieces of apparatus may be implemented by a central processing unit (CPU) and a program analyzed and executed in this CPU or be implemented as hardware based on wired logic.

[Hardware Configuration]

Figure 15:
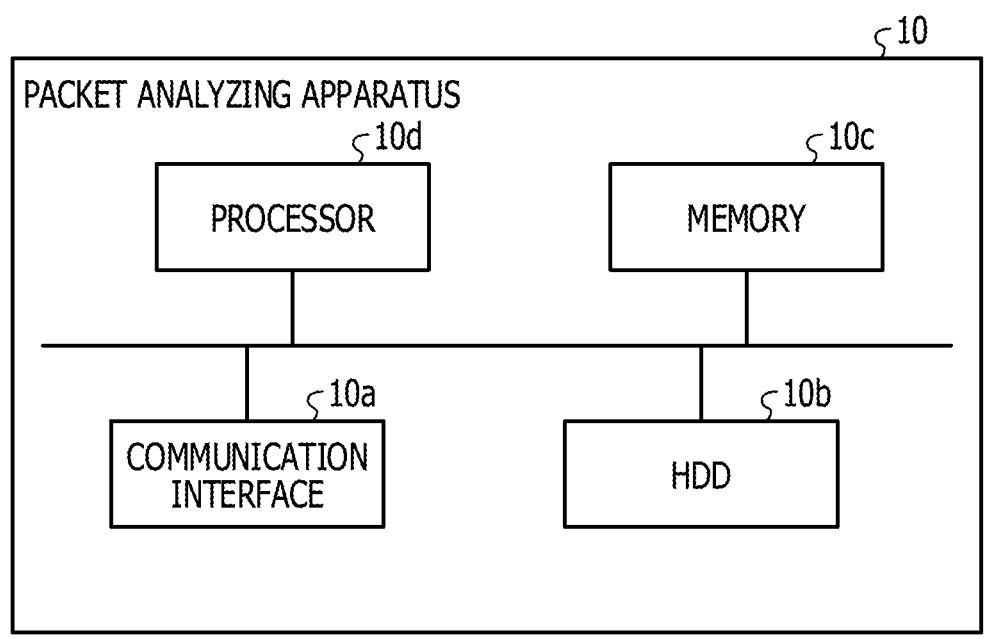
FIG. 15 is a diagram illustrating a hardware configuration example.

FIG. 15 is a diagram illustrating a hardware configuration example. As illustrated in FIG. 15, the packet analyzing apparatus 10 includes a communication interface 10a, a hard disk drive (HDD) 10b, a memory 10c, and a processor 10d.

The communication interface 10a is a network interface card or the like that controls communication with other pieces of apparatus. The HDD 10b is one example of storing apparatus that stores programs, data, and so forth.

As one example of the memory 10c, a random access memory (RAM) such as synchronous dynamic random access memory (SDRAM), a read only memory (ROM), a flash memory, and so forth are cited. As one example of the processor 10d, a CPU, a digital signal processor (DSP), a field programmable gate array (FPGA), a programmable logic device (PLD), and so forth are cited.

The packet analyzing apparatus 10 operates as information processing apparatus that carries out a packet analysis method by reading out and executing a program. For example, the packet analyzing apparatus 10 executes the program that executes the similar functions to the acquiring unit 21, the detecting unit 22, the classifying unit 23, the calculating unit 24, and the quality measuring unit 25. As a result, the packet analyzing apparatus 10 may execute a process that executes the similar functions to the acquiring unit 21, the detecting unit 22, the classifying unit 23, the calculating unit 24, and the quality measuring unit 25. The program in this another embodiment is not limited to execution by the packet analyzing apparatus 10. For example, the present application may be similarly applied also to the case in which another computer or server executes the program or the computer and the server execute the program in cooperation.

This program may be distributed via a network such as the Internet. This program may be recorded on a computer-readable recording medium such as a hard disk, a flexible disk (FD), a compact disc (CD)-ROM, a magneto-optical disk (MO), or a digital versatile disc (DVD) and may be executed by being read out from the recording medium by a computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium having stored therein a program for packet classification, the program causing a computer to execute a process comprising:
   acquiring a data request transmitted from a receiving apparatus to a transmitting apparatus when one or more packets having a predetermined data amount transmitted from the transmitting apparatus is received by the receiving apparatus, the data request including a number indicating that the receiving apparatus has received data up to the predetermined data amount;
   acquiring a plurality of packets transmitted by the transmitting apparatus in response to receiving the data request, the plurality of packets being generated by dividing data having the predetermined data amount specified by the number included in the data request, the plurality of packets respectively including the number;
   when the plurality of packets include a retransmission packet and a lost packet corresponding to the retransmission packet has not been acquired, classifying a position of the lost packet as any of a last packet, an intermediate packet, and a leading packet of the data by comparing the number included in the retransmission packet and the number included in each of packets previous and subsequent to the lost packet as a packet that is lost; and
   calculating a retransmission time by a calculation method of the retransmission time identified based on the classified position of the lost packet.

2. The storage medium according to claim 1, wherein the classifying includes classifying the position of the lost packet as the last packet when a push flag of transmission control protocol is included in a header of the retransmission packet.

3. The storage medium according to claim 1, wherein the classifying includes:
   identifying the packets previous and subsequent to the lost packet from packets that have been acquired in accordance with a sequential number included in a header of the retransmission packet, and
   classifying the position of the lost packet by comparing the number included in the retransmission packet and the number included in each of the packets previous and subsequent to the lost packet.

4. The storage medium according to claim 3, wherein the classifying includes classifying the position of the lost packet as the leading packet when the number of the retransmission packet is larger than the number of a packet immediately previous to the lost packet and the number of the retransmission packet corresponds with the number of a packet immediately subsequent to the lost packet.

5. The storage medium according to claim 3, wherein the classifying includes classifying the position of the lost packet as the intermediate packet when the number of the retransmission packet corresponds with the number of a packet immediately previous to the lost packet and the number of the retransmission packet corresponds with the number of a packet immediately subsequent to the lost packet.

6. The storage medium according to claim 3, wherein the classifying includes classifying the position of the lost packet as the last packet when the number of the retransmission packet corresponds with the number of a packet immediately previous to the lost packet and the number of the retransmission packet is smaller than the number of a packet immediately subsequent to the lost packet.

7. The storage medium according to claim 1, wherein the calculating includes specifying a mathematical expression for calculating the retransmission time according to the classified position of the lost packet.

8. A packet classification method executed by a processor of a packet classification apparatus, the packet classification method comprising:
   acquiring a data request transmitted from a receiving apparatus to a transmitting apparatus when one or more packets having a predetermined data amount transmitted from the transmitting apparatus is received by the receiving apparatus, the data request including a number indicating that the receiving apparatus has received data up to the predetermined data amount;
   acquiring a plurality of packets transmitted by the transmitting apparatus in response to receiving the data request, the plurality of packets being generated by dividing data having the predetermined data amount specified by the number included in the data request, the plurality of packets respectively including the number;
   when the plurality of packets include a retransmission packet and a lost packet corresponding to the retransmission packet has not been acquired, classifying a position of the lost packet as any of a last packet, an intermediate packet, and a leading packet of the data by comparing the number included in the retransmission packet and the number included in each of packets previous and subsequent to the lost packet as a packet that is lost; and
   calculating a retransmission time by a calculation method of the retransmission time identified based on the classified position of the lost packet.

9. A packet classification apparatus, comprising:
   a memory; and
   a processor coupled to the memory and configured to:
   acquire a data request transmitted from a receiving apparatus to a transmitting apparatus when one or more packets having a predetermined data amount transmitted from the transmitting apparatus is received by the receiving apparatus, the data request including a number indicating that the receiving apparatus has received data up to the predetermined data amount,
   acquire a plurality of packets transmitted by the transmitting apparatus in response to receiving the data request, the plurality of packets being generated by dividing data having the predetermined data amount specified by the number included in the data request, the plurality of packets respectively including the number,
   when the plurality of packets include a retransmission packet and a lost packet corresponding to the retransmission packet has not been acquired, classify a position of the lost packet as any of a last packet, an intermediate packet, and a leading packet of the data by comparing the number included in the retransmission packet and the number included in each of packets previous and subsequent to the lost packet as a packet that is lost, and calculate a retransmission time by a calculation method of the retransmission time identified based on the classified position of the lost packet.

10. The packet classification apparatus according to claim 9, wherein the processor is configured to classify the position of the lost packet as the last packet when a push flag of transmission control protocol is included in a header of the retransmission packet.

11. The packet classification apparatus according to claim 9, wherein the processor is configured to:
identify the packets previous and subsequent to the lost packet from packets that have been acquired in accordance with a sequential number included in a header of the retransmission packet, and
classify the position of the lost packet by comparing the number included in the retransmission packet and the number included in each of the packets previous and subsequent to the lost packet.

12. The packet classification apparatus according to claim 11, wherein the processor is configured to classify the position of the lost packet as the leading packet when the ACK number of the retransmission packet is larger than the number of a packet immediately previous to the lost packet and the number of the retransmission packet corresponds with the number of a packet immediately subsequent to the lost packet.

13. The packet classification apparatus according to claim 11, wherein the processor is configured to classify the position of the lost packet as the intermediate packet when the number of the retransmission packet corresponds with the number of a packet immediately previous to the lost packet and the number of the retransmission packet corresponds with the number of a packet immediately subsequent to the lost packet.

14. The packet classification apparatus according to claim 11, wherein the processor is configured to classify the position of the lost packet as the last packet when the number of the retransmission packet corresponds with the number of a packet immediately previous to the lost packet and the number of the retransmission packet is smaller than the number of a packet immediately subsequent to the lost packet.

15. The packet classification apparatus according to claim 9, wherein the processor is configured to specify a mathematical expression for calculating the retransmission time according to the classified position of the lost packet.

* * * * *